United States Patent [19]

Bonazzo

[11] Patent Number: 4,536,290

[45] Date of Patent: Aug. 20, 1985

[54] WATER FILTRATION DEVICE

[76] Inventor: Robert Bonazzo, 27 Bonazzo Dr., Trumbull, Conn. 06883

[21] Appl. No.: 579,984

[22] Filed: Feb. 14, 1984

[51] Int. Cl.³ .............................................. B01D 29/24
[52] U.S. Cl. .................................... 210/419; 210/449
[58] Field of Search ................... 210/433.1, 419, 420, 210/422, 449, 424, 423, 316

[56] References Cited

U.S. PATENT DOCUMENTS

| 802,555 | 10/1905 | Colestock | 210/449 |
|---|---|---|---|
| 2,210,846 | 8/1940 | Aghnides | 210/449 |
| 2,314,357 | 3/1943 | Lehman | 210/449 |
| 2,334,802 | 11/1943 | Zuckermann | 210/449 |
| 2,615,385 | 10/1952 | Smail | 210/421 |
| 3,476,251 | 11/1969 | Kudalty | 210/420 |
| 3,760,951 | 9/1973 | Mansfield | 210/449 |
| 3,780,869 | 12/1973 | Krongos | 210/449 |
| 3,789,991 | 2/1974 | Krongos | 210/449 |
| 3,822,018 | 7/1974 | Krongos | 210/449 |
| 4,288,325 | 9/1981 | Lieberman | 210/449 |
| 4,410,425 | 10/1983 | Gardes | 210/449 |

Primary Examiner—Barry S. Richman
Assistant Examiner—John Donofrio

[57] ABSTRACT

A water purification device has first and second like hollow elongated members adapted for detachable engagement with each other, and when engaged defining an elongated housing having a cylindrically shaped central section and opposite ends with small openings. A cylindrically shaped filter is disposed removably in said central section. The filter ends are disposed transversely to an axial bore in the filter. A first mechanism detachably securable to a water faucet pivotably secures one housing end to the faucet and conducts water from the port into the housing. A thin flat annularly shaped disposable fiber prefilter removably overlies the end of the filter adjacent said one housing end. A second mechanism connected between said first mechanism and the bore has a first position at which the conducted water flows through the device unfiltered and has a second position at which the water is filtered.

6 Claims, 6 Drawing Figures

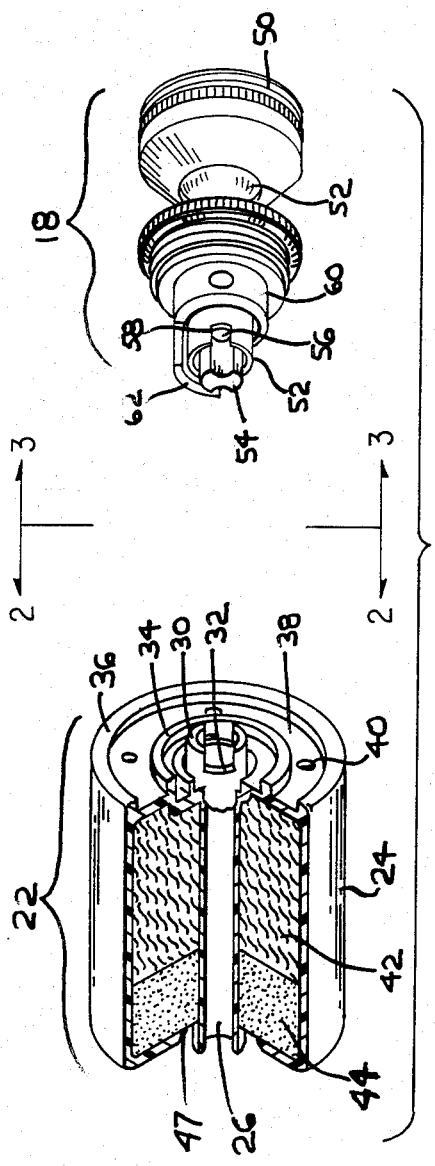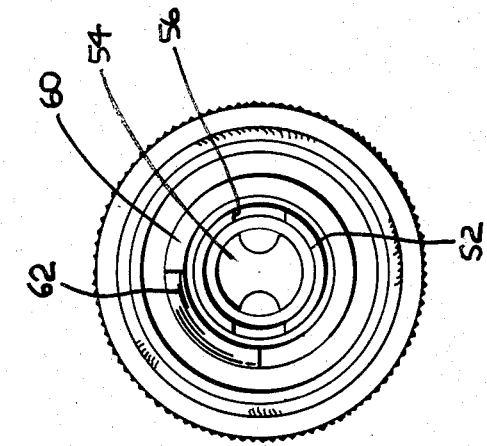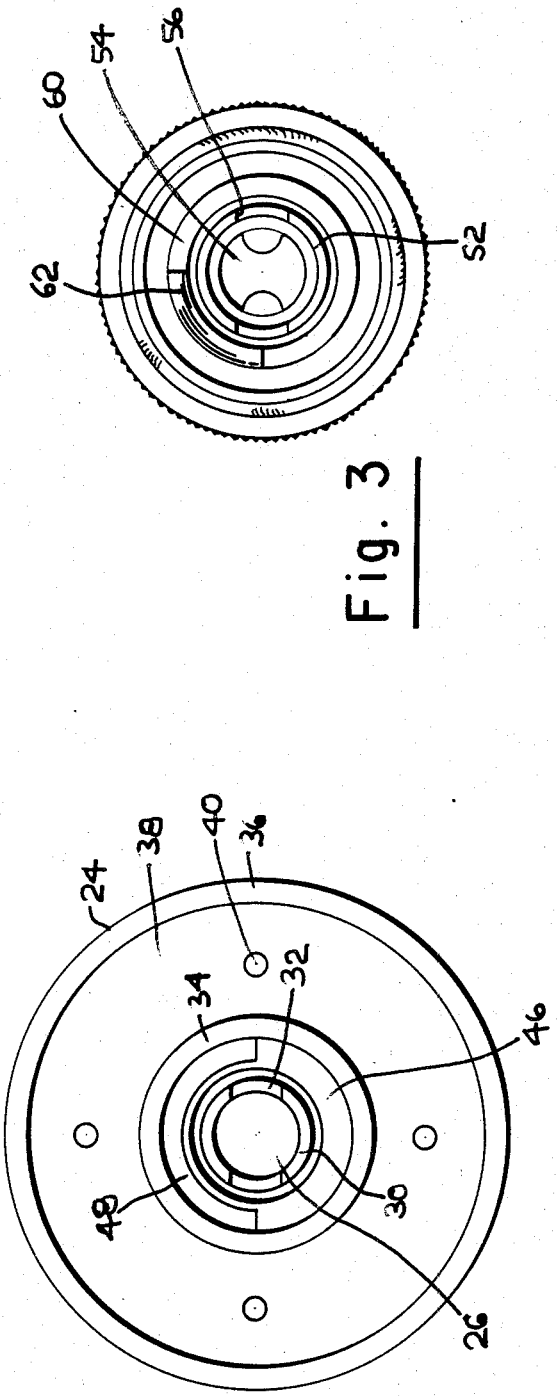

WATER FILTRATION DEVICE

BACKGROUND OF THE INVENTION

The present invention is directed toward a durable inexpensive device which can be detachably secured to a water faucet to conduct water therefrom to a discharge port in the device itself. The device contains inexpensive disposable water filter means which can be replaced as desired. The device contains a manually operated means which in one position causes the water flowing through the device to be filtered prior to discharge and in another position allows the water to flow, unfiltered, through the device.

SUMMARY OF THE INVENTION

A water filtration device in accordance with the invention employs first and second like hollow elongated members. Each member has a small opening in one end and a large opening in the other end, the large end openings in both members being adapted for detachable engagement with each other. Said members, when engaged, define an elongated housing having a cylindrically shaped central section and opposite ends with small openings therein.

A cylindrically shaped filter is disposed removably in said central section. The filter has an axial bore. The housing end openings are centered on an axis extending through said bore, each of the ends of said filter disposed transversely to said axis having openings spaced from said bore.

First means secured to the opening in one housing end and detachably securable to the discharge port of a water faucet pivotably secure the one housing end to the port and conduct water from the port into the housing.

A thin flat annularly shaped disposable fiber prefilter can removably overlie the end of the filter adjacent said one housing end. The prefilter having a central opening aligned with said bore.

Second means in said housing is connected between said first means and the bore. The second means has a first position with respect to the housing at which the conducted water flows through said bore and out of the other end of the housing in unfiltered state. The second means also has a second position with respect to said housing at which said water flows through the prefilter, the openings in the filter end adjacent said first means which are spaced from the bore, the filter, the openings in the opposite filter end which are spaced from the bore and out of the other end of the housing in filtered state. The second means is placed in the first position when the housing is rotated in one direction about said first means and is placed in the second position when the housing is rotated in opposite direction about said first means.

When the water to be purified contains an appreciable quantity of small solid particles, it has been found that use of the filter alone without the prefilter causes the filter to plug up rapidly and thus requires rapid replacement. The filter is relatively costly. However, when the prefilter is used the particles are initially trapped in the prefilter and do not pass into the filter itself. The prefilter costs very little and is easily and quickly replaced as often as necessary, thus very substantially increasing the useful life of the filter itself.

When the quantity of small particles is sufficiently small, it is sometimes possible to dispense with the prefilter.

The filter end adjacent the second means contains discrete openings spaced from the bore. The opposite filter end contains an annular opening spaced from and surrounding the bore. The filter has two filter sections, the first section employing preformed sheets and being adjacent the second means, the second section employing carbon granules and being adjacent the other filter end.

The rate of flow of water through the filter for filtration can be varied by varying the number and size of the discrete openings in the filter end adjacent the second means.

BRIEF DESCRIPTION OF THE DRAWINGS

FIG. 1 is a view of a manually operated valve and cooperating filter used in the invention.

FIG. 2 is a view taken along line 2—2 in FIG. 1.

FIG. 3 is a view taken along line 3—3 in FIG. 1.

DETAILED DESCRIPTION OF PREFERRED EMBODIMENT

Figure 4:
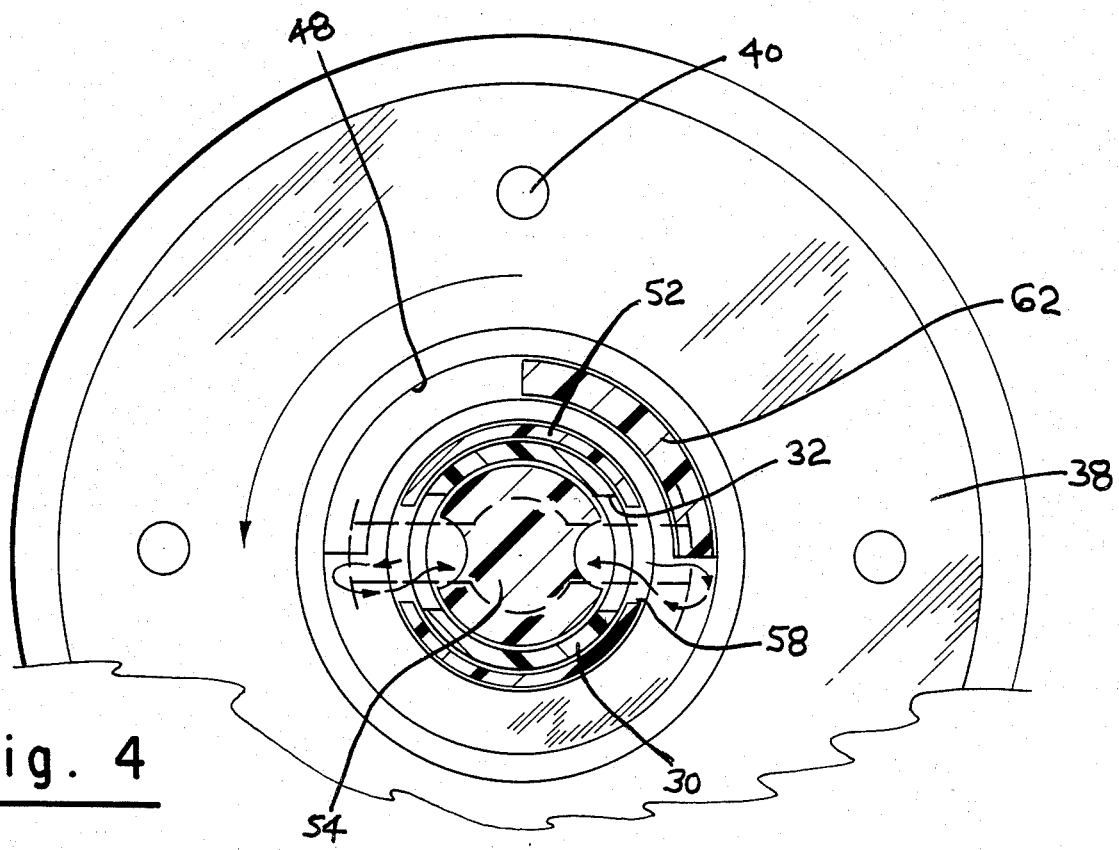
FIG. 4 is an enlarged detail plan view illustrating the position of the valve and filter when the invention is in position to filter water.
Figure 5:
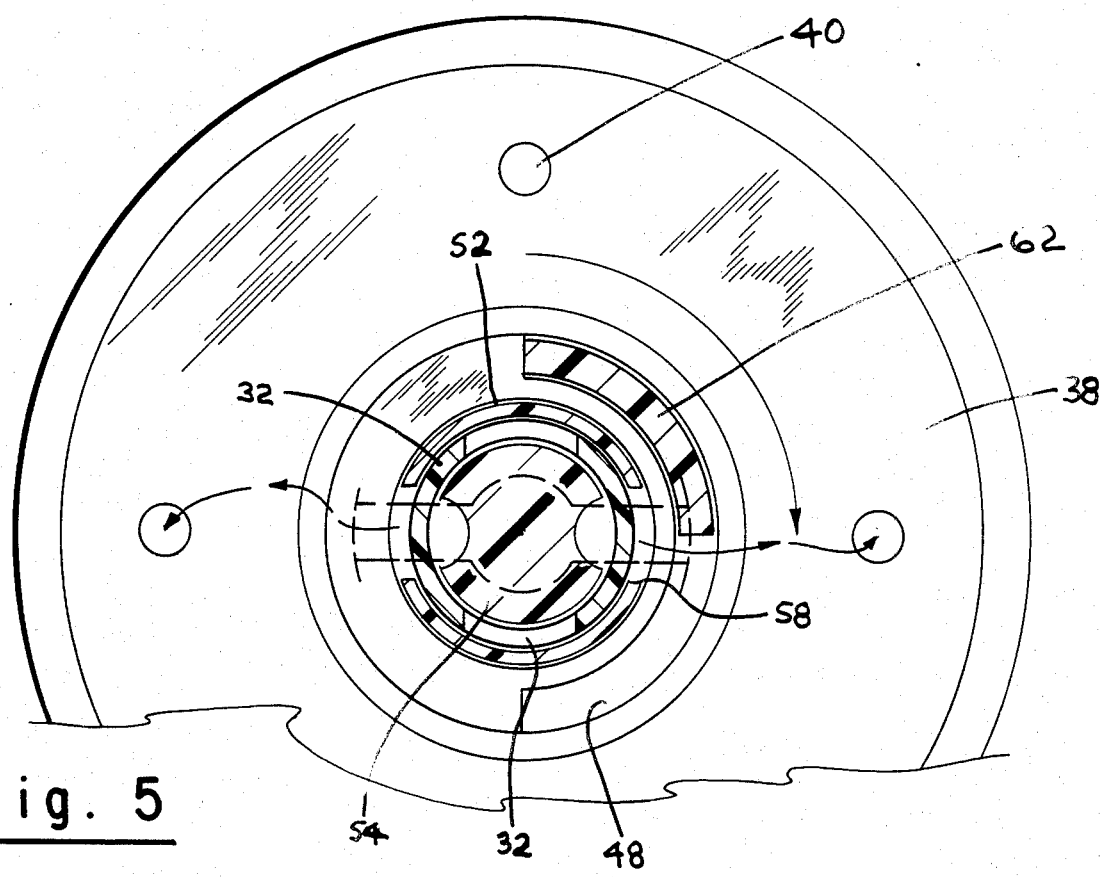
FIG. 5 is a view similar to FIG. 4 but illustrating the position of the valve and filter when the invention is in position to pass water therethrough unfiltered.
Figure 6:
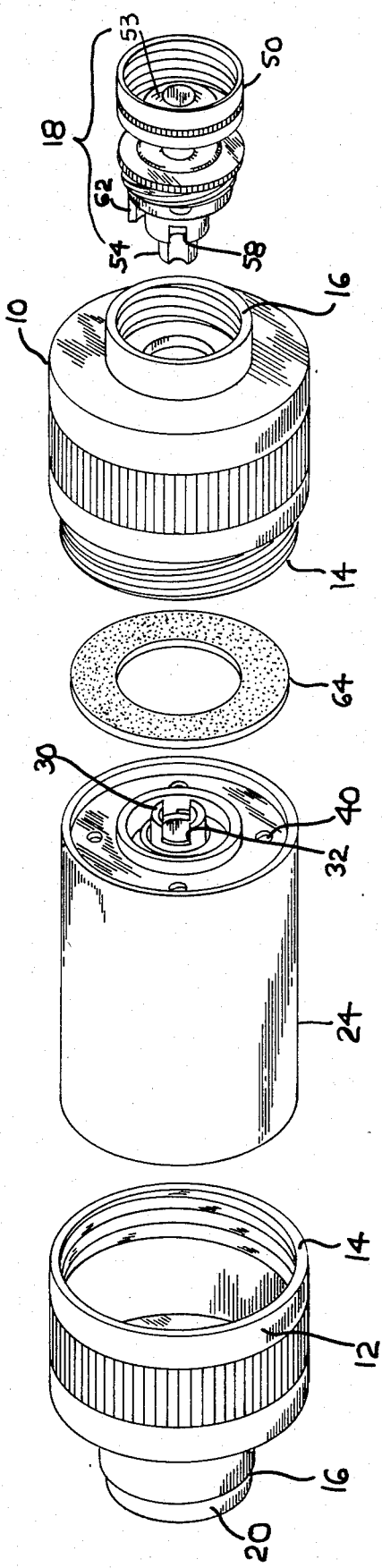
FIG. 6 is an exploded view of the invention.

Referring now to FIGS. 1-6, first and second elongated hollow member 10 and 12 have large openings 14 which can be detachably engaged to form an elongated housing. Each member has a small opposite opening 16. A mechanism 18 removably screws into one small opening. A conventional aerator device 20 (not shown in detail) of the type used in water faucets in homes, which contains a plurality of stacked circular screens) removably screws into the opposite small opening.

A plastic cylindrical water filter 22 is disposed removably in the hollow central section of the housing. The filter has an outer cylinder 24 with an axial bore 26. The cylinder 24 is enclosed at each end by an end cap. The end cap nearest the mechanism 18 has a small central opening exposing the bore with a projecting peripheral edge 30 having a transverse slot 32. A concentric raised middle ring 34 is spaced from end 30 and an outer raised concentric edge 36 of the cap is spaced from the ring. Thus there is a recessed annular region 38 disposed between ring 34 and edge 36 which contains four equidistantly spaced holes 40 communicating with the interior of the filter and spaced from the bore 26. The number and size of the holes determines the rate of water flow through the filter. There is a second recessed annular region 46 between end 30 and ring 34 which itself contains recess 48. The filter interior contains corrugated preformed sheets 42 which constitute a first section and contains carbon granules 44 which constitute a second section. A porous plastic disc 45 at the bottom of the granules and sealed in the cylinder has pores large enough to allow water to pass through and small enough to prevent the granules from escaping. The bottom end of the filter is secured in cylinder 24 and is annularly spaced from the bore leaving an annular opening 47 through which water can flow.

Mechanism 18 includes a cap 50 which detachably engages the discharge port of a water faucet. One end of hollow tube 52 is secured to the cap. The other end of the tube terminates in a hollow plastic insert 54 having two opposite side ports 56 through which water flows when the faucet is turned on. The other end of the tube also has a transverse slot 58. The inner diameter of tube 52 is larger than the outer diameter of end 30 so that when the mechanism 18 is in place tube 52 is disposed concentrically about end 30.

When tube 52 is disposed with slot 58 aligned with slot 32, the water from the faucet is guided outward to region 38 and flows through the holes 40 in the first filter cap and then through the filter sections and is discharged through opening 47 in the bottom filter cap and out of the aerator device in filtered condition. When the tube is disposed with slot 58 out of alignment with slot 32, the water is guided through bore 26 and is discharged in unfiltered condition.

When the mechanism 18 is installed, an outer cylindrical member 60 disposed concentrically about tube 52 has an extension 62 which engages slot 48. The member 60 has an enlarged threaded portion which threadedly engages the small end 16 of member 10.

By tilting the housing slightly with respect to the tube 52, the housing can be rotated about the tube 52 to enable the device to be used to filter water or alternatively to pass water therethrough unfiltered. The tube is rotatable within the cap and within the member 60 but the slight housing tilt locks the tube within the cap thus allowing the device to be rotated manually as indicated.

When the water to be filtered contains a high percentage of solids, the filter 22 will plug up rapidly. In order to prolong the life of the filter, a thin annular fiber washer 64 which is water permeable, inexpensive and readily disposable is removably disposed in region 38 whereby water to be filtered must first flow through washer 64 which acts as a prefilter to remove solids before the water reaches openings 40.

The use of slot 48 and extension 62 limits the extent of rotation of the housing in either direction. O rings, not shown, can be inserted as necessary to eliminate water leakage about the filter, housing, cap and aerator.

What is claimed is:

1. A water filtration device comprising:

first and second like hollow elongated members, each member having a small opening in one end and a large opening in the other end, the large openings in both members being adapted for detachable engagement with each other, said members when engaged defining an elongated housing having a cylindrically shaped central section and opposite upper and lower ends with small openings therein;

a single cylindrically shaped filter disposed removably in said central section, said filter having an axial bore aligned with the axis of said section, said housing end openings being centered on said axis, the ends of said filter disposed transversely to said axis having openings spaced from said bore;

first means secured to the opening in the upper housing end and detachably securable to the discharge port of a water faucet to secure said upper housing end in a rotationally pivotable manner to the port and to conduct water downwardly from the port into the housing; and second means in the housing and connected between the first means and the bore, said second means having a first position with respect to said housing at which the conducted water flows downwardly through said bore and out of the lower end of the housing in unfiltered state and having a second position at which the water flows through the openings in the filter end adjacent the first means spaced from the bore, the filter, the openings in the opposite filter end spaced from the bore and out of the lower end of the housing in filtered state, the second means being placed in the first position when the housing is rotated in one direction about the first means and being placed in the second position when the housing is rotated in opposite direction about the first means.

2. The device of claim 1 further including a thin flat annularly shaped disposable fiber prefilter removably overlying the end of the filter adjacent the upper housing end, said prefilter having a central opening aligned with said bore.

3. The device of claim 2 wherein said second means includes an extension and said filter has an end cap adjacent said second means, said end cap having a slot engaged by said extension, the movement of said extension in said slot limiting the extent of rotation of said housing about said second means.

4. The device of claim 3 wherein said second means includes a hollow tube connected at one end to said first means, said tube having a hollow insert in its opposite end, said insert having two oppositely disposed side ports.

5. The device of claim 4 wherein a ring having said extension is concentrically disposed in fixed position about said insert, said ring having a slot aligned with said ports.

6. The device of claim 5 wherein said end cap has a projecting peripheral edge with a transverse slot and a central opening communicating with said bore, said insert extending into said central opening, said ring being concentrically disposed about said peripheral edge.

* * * * *